(12) United States Patent　(10) Patent No.: US 10,599,189 B1
Hsu et al.　(45) Date of Patent: Mar. 24, 2020

(54) BENDABLE SUPPORT APPARATUS FOR A FLEXIBLE DISPLAY

(71) Applicant: FOSITEK CORPORATION, New Taipei (TW)

(72) Inventors: An-Szu Hsu, New Taipei (TW); Yang-Zhong Wu, Shenzhen (CN); Yu-Feng Xu, Shenzhen (CN)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/523,727

(22) Filed: Jul. 26, 2019

(30) Foreign Application Priority Data

Apr. 26, 2019　(CN) .......................... 2019 1 0344066
Apr. 26, 2019　(CN) ..................... 2019 2 0603946 U

(51) Int. Cl.
　　*G06F 1/16*　　　(2006.01)
　　*E05D 3/18*　　　(2006.01)
　　*G09F 9/30*　　　(2006.01)

(52) U.S. Cl.
　　CPC ............. *G06F 1/1681* (2013.01); *E05D 3/18* (2013.01); *E05Y 2900/606* (2013.01); *G06F 1/1652* (2013.01); *G09F 9/301* (2013.01)

(58) Field of Classification Search
　　CPC combination set(s) only.
　　See application file for complete search history.

(56) References Cited

U.S. PATENT DOCUMENTS

| | | | | |
|---|---|---|---|---|
| 9,841,050 B2 * | 12/2017 | Hsu | .......................... | F16C 11/04 |
| 9,860,999 B1 * | 1/2018 | Hsu | .......................... | E05D 3/06 |
| 9,870,031 B2 * | 1/2018 | Hsu | ........................ | G06F 1/1681 |
| 9,874,048 B1 * | 1/2018 | Hsu | ..................... | E05D 11/1028 |
| 9,874,906 B1 * | 1/2018 | Hsu | ........................ | G06F 1/1681 |
| 9,915,981 B2 * | 3/2018 | Hsu | ........................ | G06F 1/1681 |
| 10,209,743 B1 * | 2/2019 | Hsu | .................... | H05K 7/20954 |
| 10,352,354 B1 * | 7/2019 | Hsu | ........................ | G06F 1/1652 |
| 10,401,917 B1 * | 9/2019 | Dai | ........................ | G06F 1/1652 |
| 10,480,225 B1 * | 11/2019 | Hsu | ..................... | E05D 7/0045 |
| 10,520,988 B2 * | 12/2019 | Hsu | ...................... | E05D 11/105 |
| 2017/0227994 A1 * | 8/2017 | Hsu | .......................... | E05D 3/06 |
| 2019/0040904 A1 * | 2/2019 | Hsu | .......................... | E05D 3/12 |
| 2019/0112852 A1 * | 4/2019 | Hsu | ..................... | E05D 11/105 |
| 2019/0391618 A1 * | 12/2019 | Hsu | ........................ | G06F 1/1652 |
| 2019/0394890 A1 * | 12/2019 | Cromer | ................ | H05K 5/0226 |

* cited by examiner

*Primary Examiner* — Lisa Lea-Edmonds
(74) *Attorney, Agent, or Firm* — Hamre, Schumann, Mueller & Larson, P.C.

(57) ABSTRACT

A bendable support apparatus includes a support unit, at least one coaxially pivoting unit and at least one synchronously pivoting unit. The support unit includes a plurality of support members extending in a first direction and juxtaposed to each other. Each support member has opposite support and mounting major surfaces. The support major surfaces cooperatively define a support surface for a flexible display attached thereto. The coaxially pivoting unit includes a plurality of coaxially pivoting assemblies disposed to permit two adjacent support members to be coaxially pivoted to each other about a pivot axis at a neutral layer of the flexible display. The synchronously pivoting unit includes a plurality of synchronously pivoting assemblies each disposed among three adjacent support members to permit two lateral support members to be synchronously pivoted relative to a middle support member so as to shift the bendable support apparatus between unfolded and folded states.

11 Claims, 16 Drawing Sheets

US 10,599,189 B1

BENDABLE SUPPORT APPARATUS FOR A FLEXIBLE DISPLAY

CROSS-REFERENCE TO RELATED APPLICATION

This application claims priority of Chinese Patent Application No. 201910344066.5, filed on Apr. 26, 2019, and priority of Chinese Patent Application No. 201920603946.5, filed on Apr. 26, 2019.

FIELD

The disclosure relates to an electronic device, and more particularly to a bendable support apparatus for a flexible display.

BACKGROUND

In recent years, the research and development of flexible displays have been gradually flourishing and the flexible displays are more and more commonly applied to consumer electronic products. However, it is needed to contemplate the support frame or casing for the flexible display to be attached thereto when used in a folded state, where the flexible display is not liable to be improperly bent and gradually broken.

SUMMARY

Therefore, an object of the disclosure is to provide a bendable support apparatus for a flexible display that can alleviate at least one of the drawbacks of the prior art.

According to the disclosure, the bendable support apparatus for supporting a flexible display includes a support unit, at least one coaxially pivoting unit and at least one synchronously pivoting unit. The support unit includes a plurality of support members each of which extends in a first direction and which are juxtaposed to each other in a second direction that is transverse to the first direction. Each of the support members has support and mounting major surfaces opposite to each other. The support major surfaces of the support members cooperatively define a support surface for the flexible display to be attached thereto. The coaxially pivoting unit includes a plurality of coaxially pivoting assemblies each disposed between two adjacent ones of the support members. Each of the coaxially pivoting assemblies includes first and second pivoting members which are respectively disposed on the mounting major surfaces of the two adjacent ones of the support members and adjacent to each other in the first direction. The first pivoting member has an arcuate first sliding rail which extends to define a curvature center that is remoter from the mounting major surface than the support major surface and that is approximately located at a neutral layer of the flexible display. The second pivoting member has a second sliding protrusion which extends in the first direction and which is in slidable engagement with the first sliding rail such that the two adjacent ones of the support members are coaxially pivotable to each other about a first pivot axis that extends in the first direction and that passes through the curvature center of the first sliding rail. The synchronously pivoting unit includes a plurality of synchronously pivoting assemblies each disposed among three adjacent ones of the support members. Each of the synchronously pivoting assemblies includes a first base seat which is disposed on the mounting major surface of a middle one of the three adjacent support members, two second base seats which are respectively disposed on the mounting major surfaces of two lateral ones of the three adjacent support members and which are spaced apart from the first base seat in the first direction, and two synchronously pivoting mechanisms, each of which is disposed between and interconnects the first base seat and a respective one of the second base seats. Each of the synchronously pivoting mechanisms is pivotably connected to the first base seat about a second pivot axis parallel to the first pivot axis, and is pivotably connected to the respective second base seat about a third pivot axis parallel to the second pivot axis. The synchronously pivoting mechanisms are in rollably frictional engagement with each other such that the two lateral support members are synchronously pivotable relative to the middle support member in opposite rotational directions. The bendable support apparatus is shiftable between an unfolded state, where the support major surfaces of the support members are parallel to one another to have the support surface in the form of a flat plane that extends in both the first and second directions, and a folded state, where the support major surfaces of the support members are inclined relative to adjacent ones of the support members to have the support surface in the form of a curved plane.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
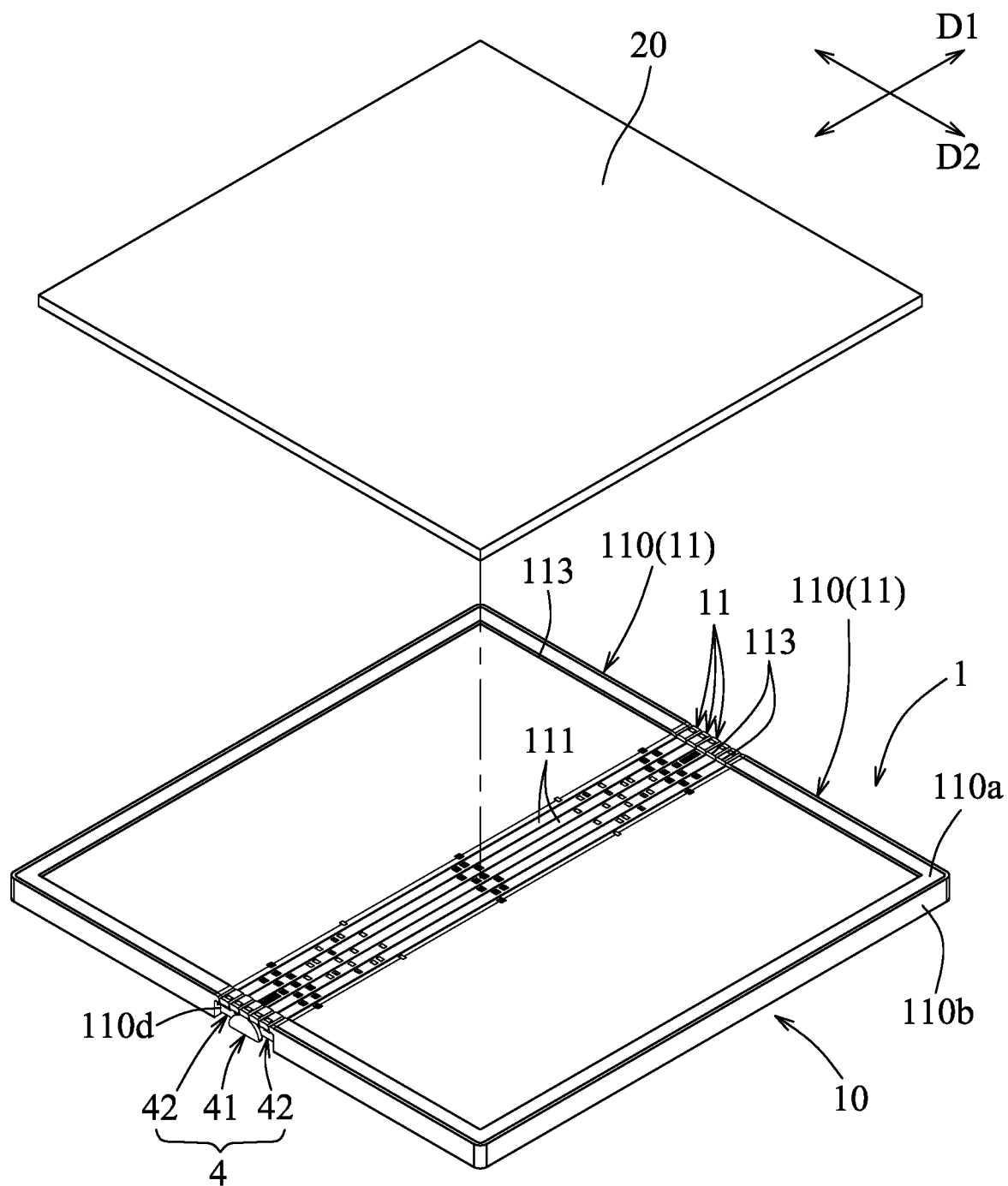
FIG. 1 is a perspective view illustrating an embodiment of a bendable support apparatus according to the disclosure and a flexible display.
Figure 2:
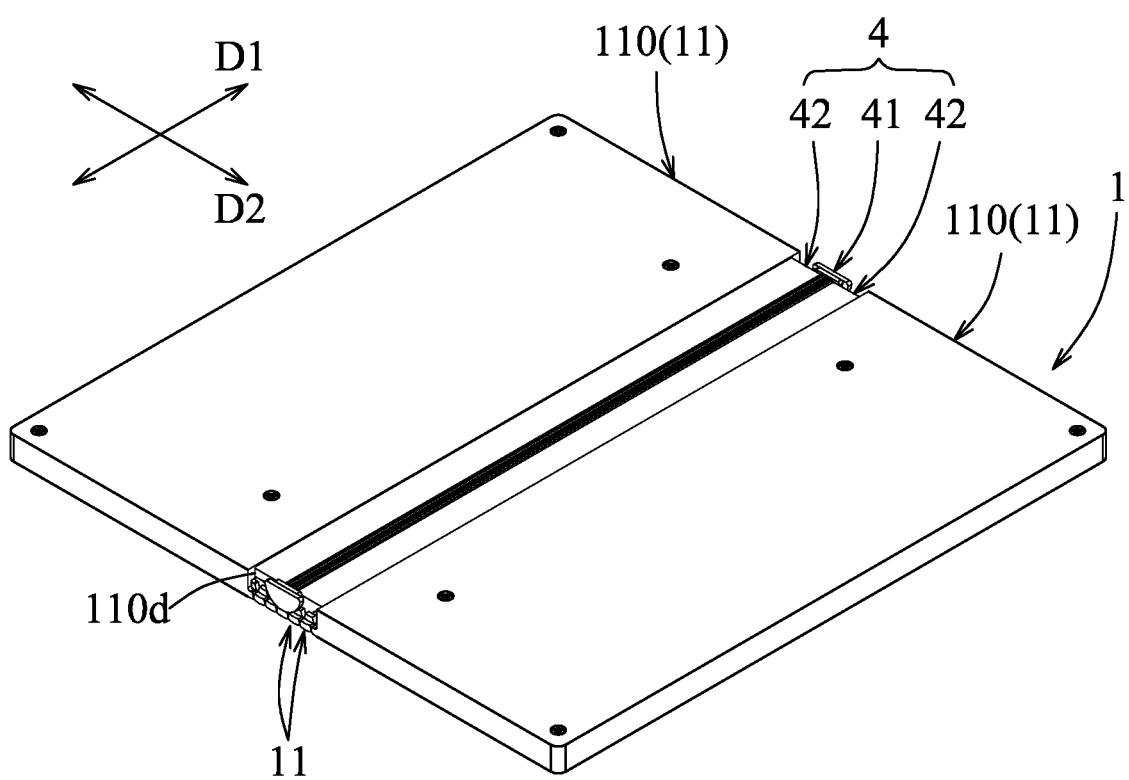
FIG. 2 is a perspective view illustrating the embodiment but viewed from another angle.
Figure 3:
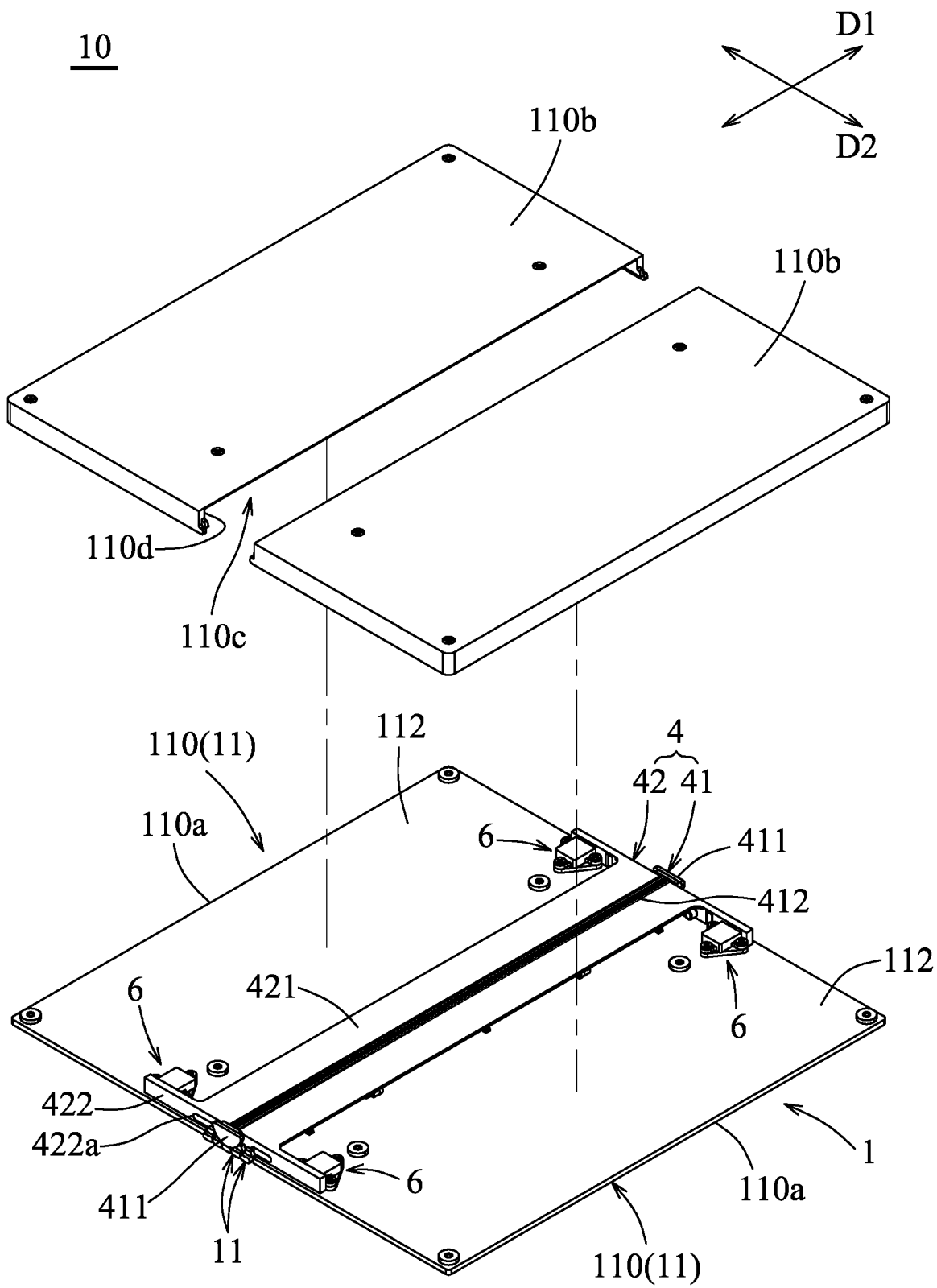
FIG. 3 is a partially exploded perspective view of the embodiment.
Figure 4:
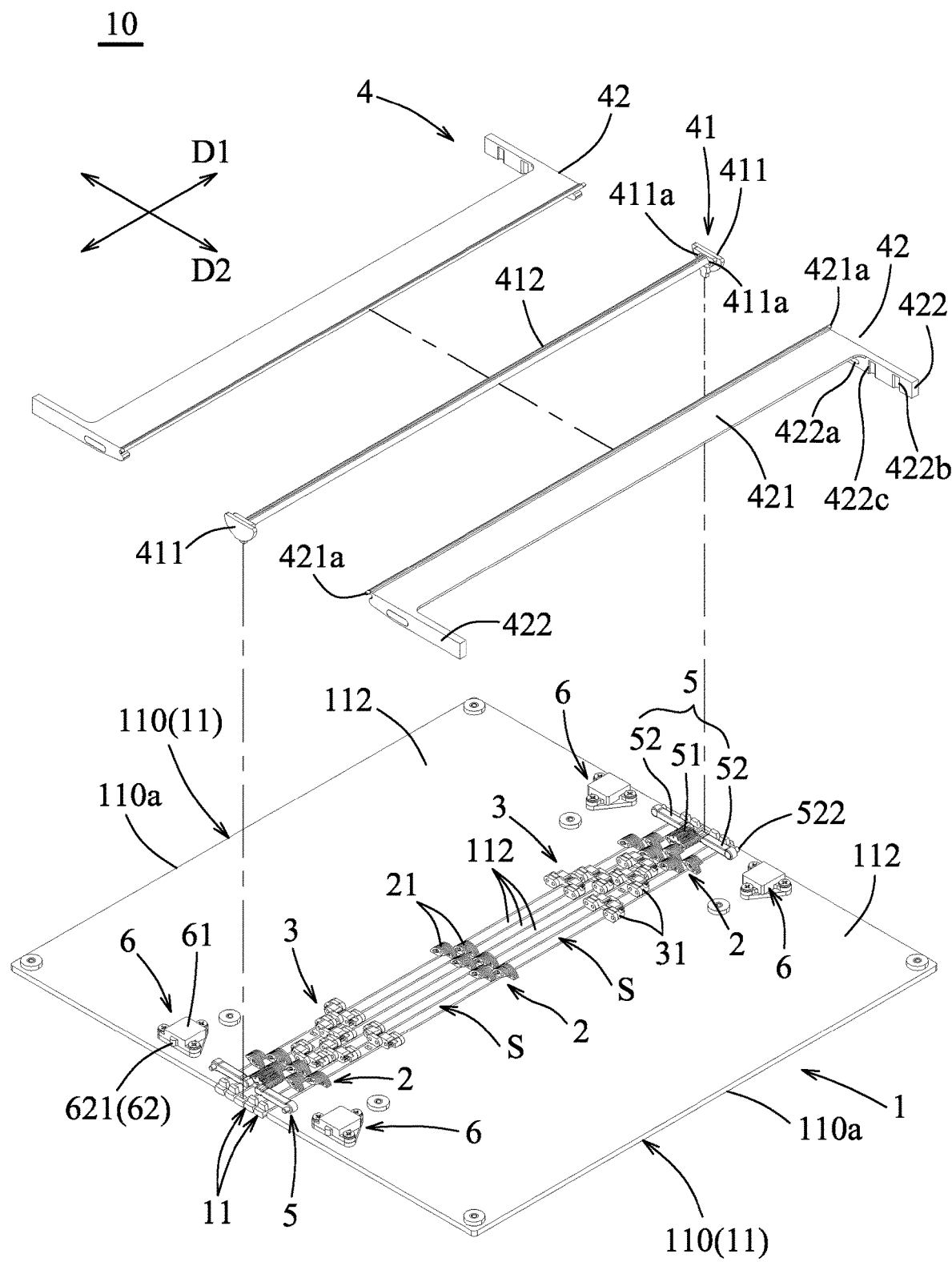
FIG. 4 is a further partially exploded perspective view of the embodiment.
Figure 5:
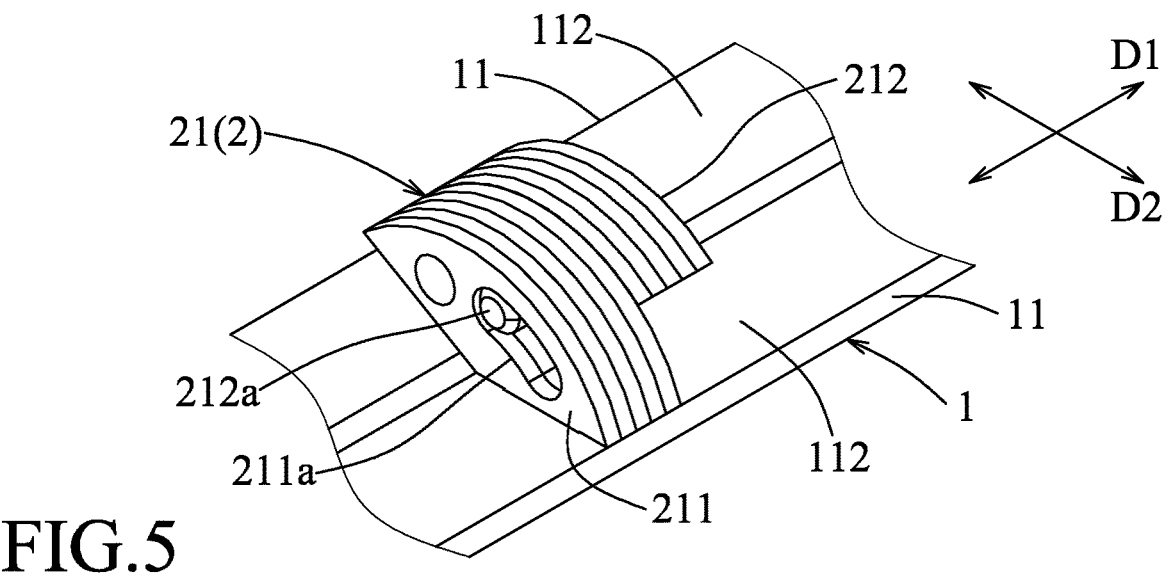
FIG. 5 is a fragmentary perspective view of a coaxially pivoting assembly of a coaxially pivoting unit of the embodiment.
Figure 6:
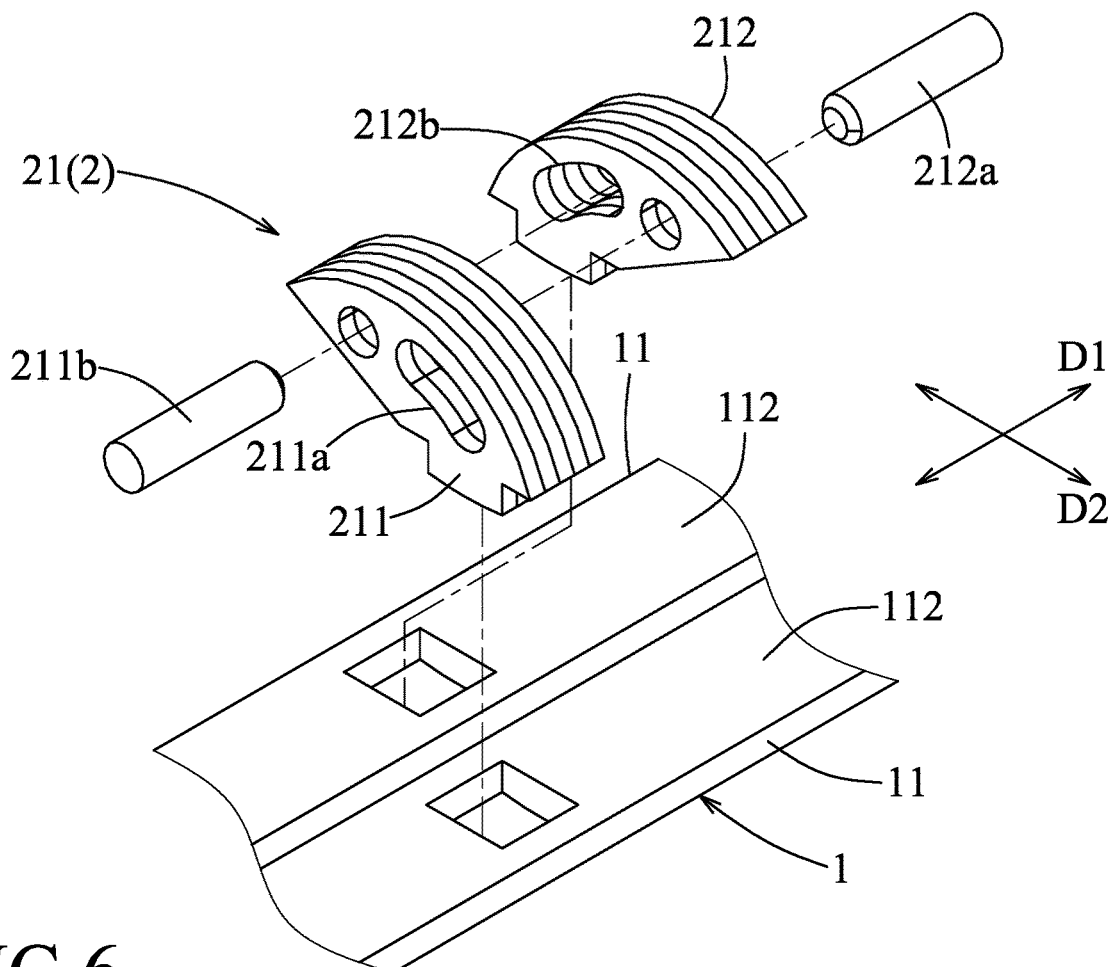
FIG. 6 is a fragmentary, exploded perspective view of FIG. 5.
Figure 7:
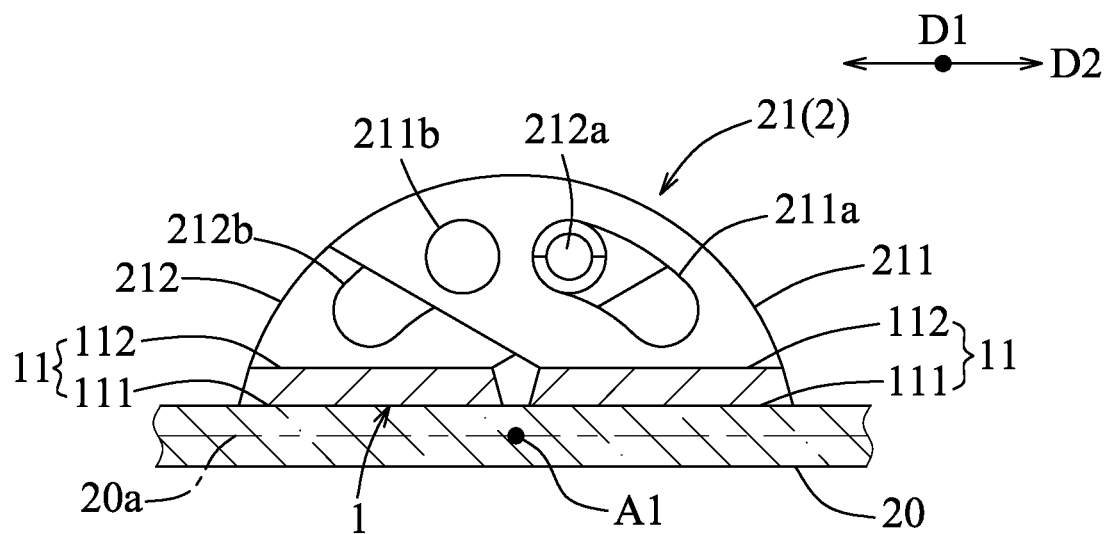
FIG. 7 is a fragmentary sectional view illustrating the coaxially pivoting assembly in a non-pivoting state.

Referring to FIGS. 1 to 4, an embodiment of a bendable support apparatus 10 is adapted for a flexible display 20 to be attached thereto, and includes a support unit 1, three coaxially pivoting units 2, two synchronously pivoting units 3, a cover unit 4, two friction increasing units 5 and two pairs of retaining mechanisms 6.

The support unit 1 includes a plurality of support members 11 each of which extends in a first direction (D1) and which are juxtaposed to each other in a second direction (D2) that is transverse to the first direction (D1). For example, the support members 11 are made of plastic or metal material. Each of the support members 11 has support and mounting major surfaces 111, 112 opposite to each other. In this embodiment, two lateral ones of the support members 11 in the second direction (D2) are respectively in the form of support housings 110. Each of the support housings 110 has a first housing shell (110a) and a second housing shell (110b) which are matingly connected to each other to cooperatively form an accommodation space (110c) therein for receiving multiple electronic elements (not shown) and associated component parts (not shown) electronically connected with the flexible display 20. The first housing shell (110a) of each support housing 110 has the support and mounting major surfaces 111, 112, and the mounting major surface 112 faces the accommodation space 110c. Specifically, each support member 11 has a concaved configuration 113 having the support major surface 111 as a bottom wall thereof such that the flexible display 20 is received in the concaved configurations 113 of the support members 11 and attached to a support surface which is cooperatively defined by the support major surfaces 111 of the support members 11. In an exemplary, non-limited embodiment, seven support members 11 are provided, and the number of the support members 11 may be varied as required.

Referring to FIGS. 4 to 8, the coaxially pivoting units 2 are spaced apart from one another in the first direction (D1) and disposed on the support members 11. Each coaxially pivoting unit 2 includes a plurality of coaxially pivoting assemblies 21 each disposed between two adjacent ones of the support members 11. Each of the coaxially pivoting assemblies 21 includes first and second pivoting members 211, 212 which are respectively disposed on the mounting major surfaces 112 of the two adjacent support members 11 and adjacent to each other in the first direction (D1). For example, each of the first and second pivoting members 211, 212 is made of multiple stamping metal sheets. The first pivoting member 211 has an arcuate first sliding rail (211a) which extends therethrough in the first direction (D1). The first sliding rail (211a) further extends to define a curvature center that is remoter from the mounting major surface 112 than the support major surface 111 and that is approximately located at a neutral layer (20a) of the flexible display 20. The second pivoting member 212 has a second sliding protrusion (212a) which extends in the first direction (D1) and which is in slidable engagement with the first sliding rail (211a) such that the two adjacent support members 11 are coaxially pivotable to each other about a first pivot axis (A1) that extends in the first direction (D1) and that passes through the curvature center. Specifically, in this embodiment, the curvature center of the first sliding rail (211a) and the first pivot axis (A1) are coincident with the neutral layer (20a). In an alternative embodiment, the curvature center of the first sliding rail (211a) and the first pivot axis (A1) may be approximately located at the neutral layer (20a). Additionally, in this embodiment, the second pivoting member 212 of each coaxially pivoting assembly 21 has an arcuate second sliding rail (212b) which extends therethrough in the first direction (D1), and extends to define a curvature center that is aligned with the curvature center of the first sliding rail (211a) in the first direction (D1). The first pivoting member 211 of each coaxially pivoting assembly 21 has a first sliding protrusion (211b) which extends in the first direction (D1) and which is in slidable engagement with the second sliding rail (212b). More specifically, each of the first and second sliding rails (211a, 212b) is in the form of an arcuate groove, and each of the first and second sliding protrusions (211b, 212a) is cylindrical to be slidably engaged in a respective one of the second and first sliding rails (212b, 211a). The second sliding protrusion (212a) is shaped and sized to matingly engage with the first sliding rail (211a) to avoid a relative rotation to each other. Alternatively, the second sliding rail (212b) and the first sliding protrusion (211b) may be omitted.

Referring to FIGS. 4 and 9 to 12, the synchronously pivoting units 3 are spaced apart from each other in the first direction (D1) and disposed on the support members 11 and between two adjacent ones of the coaxially pivoting units 2. Each synchronously pivoting unit 3 is spaced apart from the middle coaxially pivoting unit 2 by a wire passing space (S) for receiving connecting wires (not shown) of the electronic elements. The number of the synchronously pivoting units 3 may be varied as required. Each synchronously pivoting unit 3 includes a plurality of synchronously pivoting assemblies 31 each disposed among three adjacent ones of the support members 11. Each of the synchronously pivoting assemblies 31 includes a first base seat 311 which is disposed on the mounting major surface 112 of a middle one of the three adjacent support members 11, two second base seats 312 which are respectively disposed on the mounting major surfaces 112 of two lateral ones of the three adjacent support members 11 and which are spaced apart from the first base seat 311 in the first direction (D1), and two synchronously pivoting mechanisms 313, each of which is disposed between and interconnects the first base seat 311 and a respective one of the second base seats 312. Each of the synchronously pivoting mechanisms 313 is pivotably connected to the first base seat 311 about a second pivot axis (A2) parallel to the first pivot axis (A1), and is pivotably connected to the respective second base seat 312 about a third pivot axis (A3) parallel to the second pivot axis (A2). The synchronously pivoting mechanisms 313 of each synchronously pivoting assembly 31 are in rollably frictional engagement with each other such that the two lateral support members 11 are synchronously pivotable relative to the middle support member 11 in opposite rotational directions. Specifically, each synchronously pivoting mechanism 313 has a synchronously pivoting member 314 which is pivotably connected to the first base seat 311 about the second pivot axis (A2) by means of a pin 316, and a sliding member 315 which is pivotably connected to the respective second base seat 312 about the third pivot axis (A3) by means of a pin 316 and which is slidably connected to the synchronously pivoting member 314. The synchronously pivoting members 314 of the two synchronously pivoting mechanisms 313 are in rollably frictional engagement with each other, and, for example, respectively have toothed surfaces (314a) meshing with each other. In this embodiment, the synchronously pivoting member 314 has a guideway (314b) extending in the second direction (D2). The sliding member 315 has a key (315a) which projects to be in a spline engagement with the guideway (314b) so as to permit sliding engagement of the sliding member 315 with the synchronously pivoting member 314. Alternatively, the guideway and the key may be formed on the sliding member 315 and the synchronously pivoting member 314, respectively. Such configuration of the synchronously pivoting units 3 is simple, reliable and compact. The coaxially pivoting units 2 and the synchronously pivoting units 3 may be extended and fastened to the corresponding support members 11 by welding, screwing or adhering manner.

Figure 8:
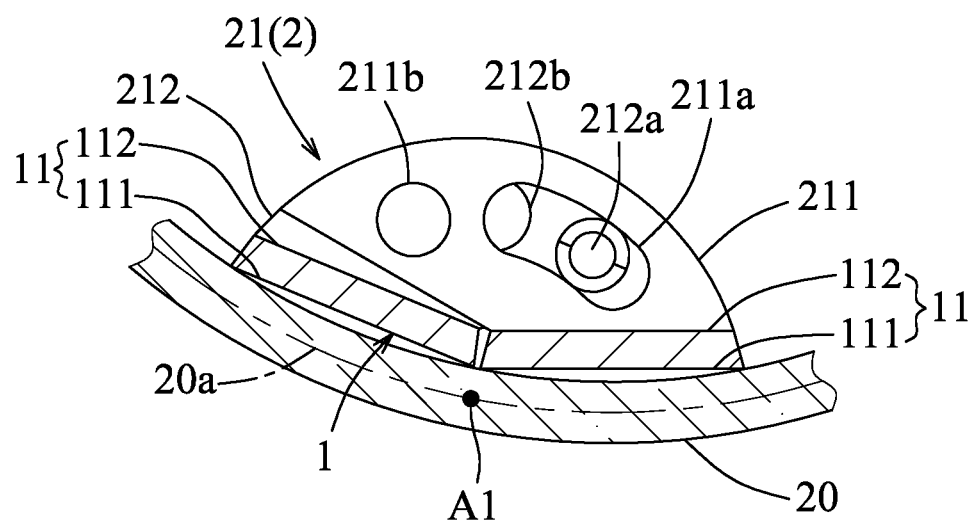
FIG. 8 is a fragmentary sectional view illustrating the coaxially pivoting assembly in a pivoting state.
Figure 9:
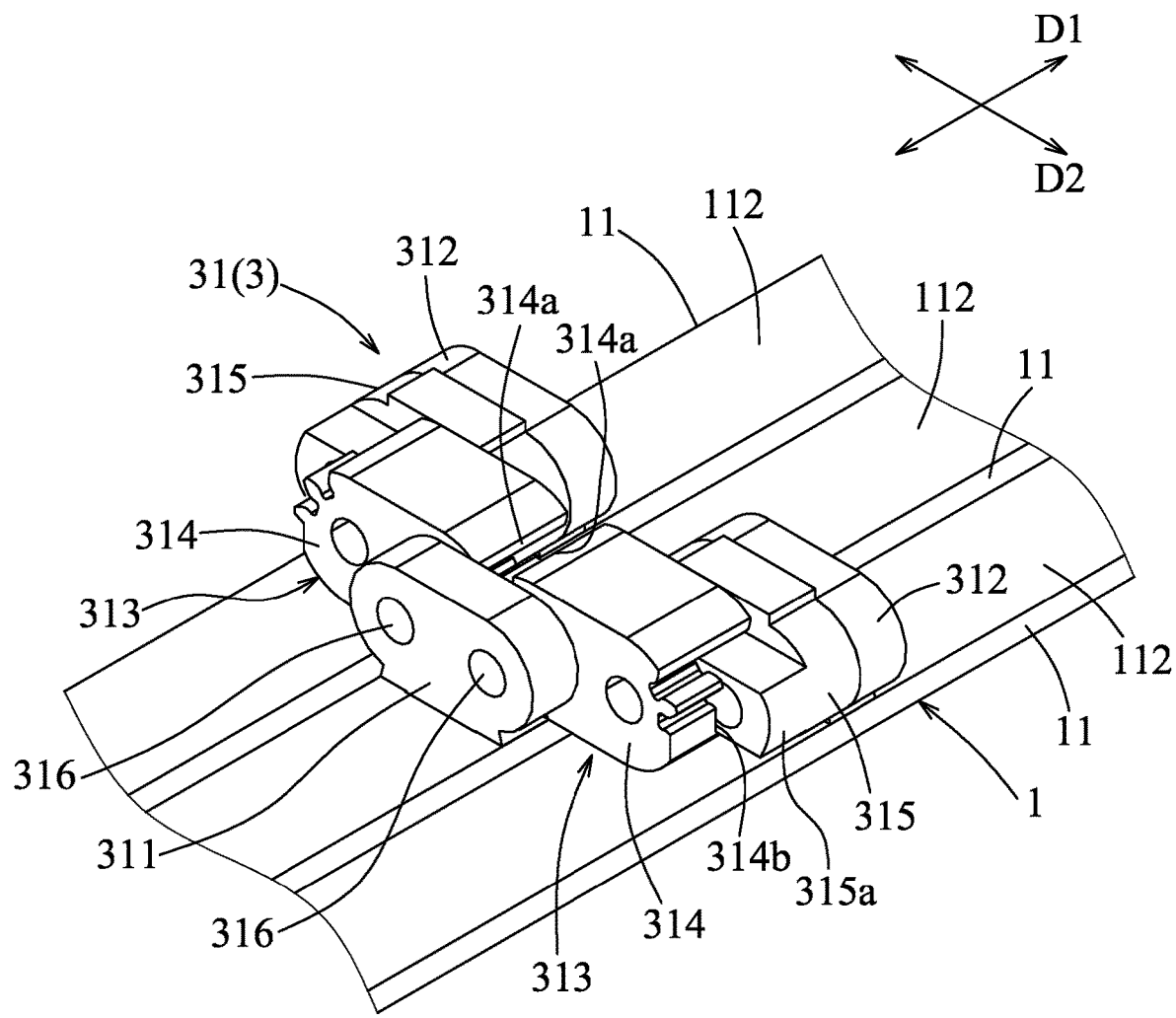
FIG. 9 is a fragmentary perspective view of a synchronously pivoting assembly of a synchronously pivoting unit of the embodiment.
Figure 10:
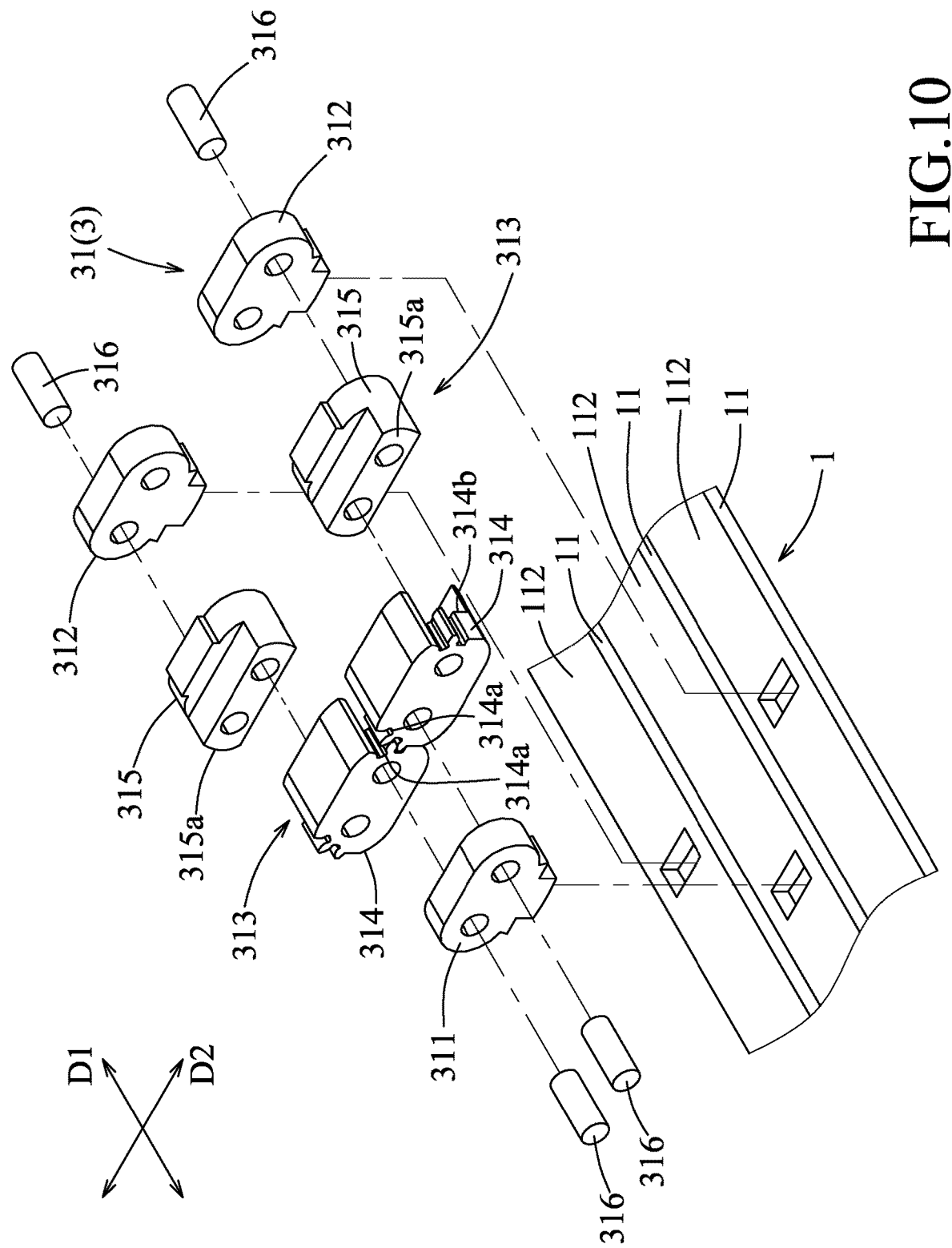
FIG. 10 is a fragmentary, exploded perspective view of FIG. 9.
Figure 11:
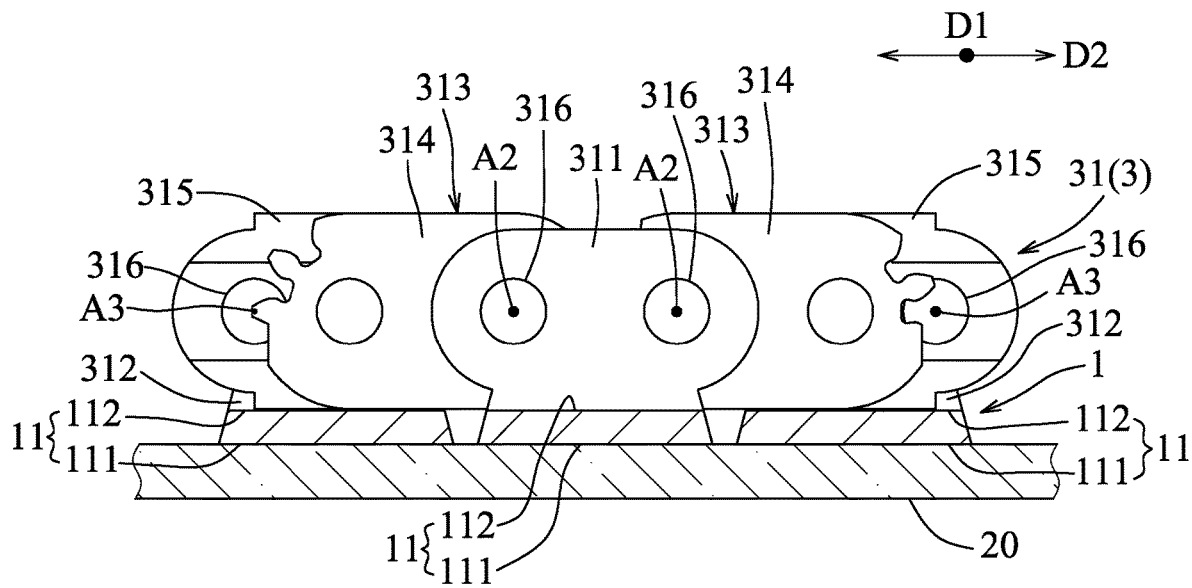
FIG. 11 is a fragmentary sectional view illustrating the synchronously pivoting assembly in a non-pivoting state.
Figure 12:
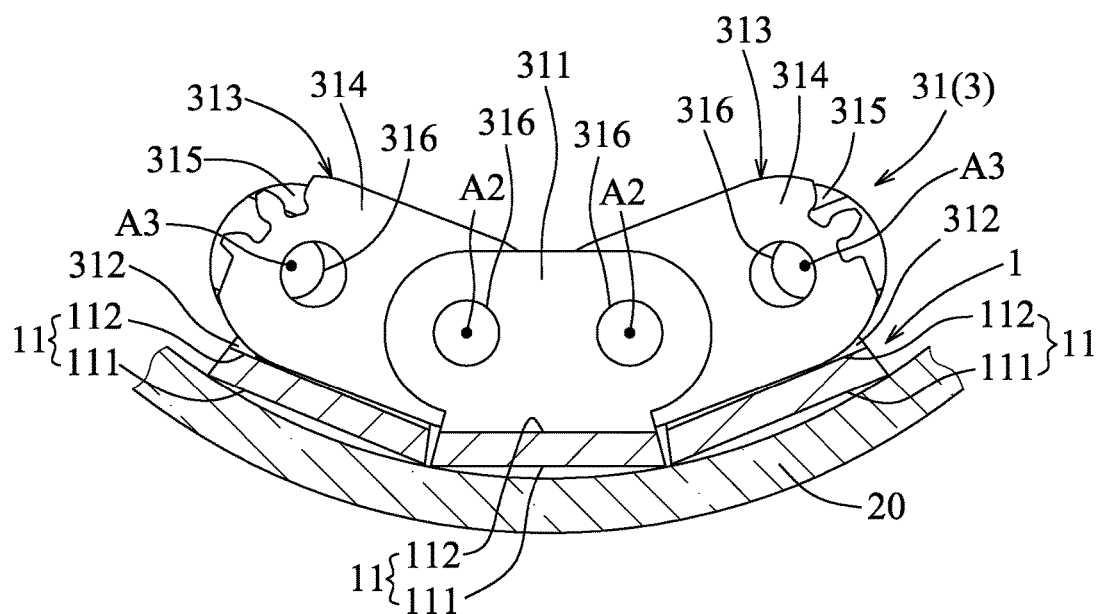
FIG. 12 is a fragmentary sectional view illustrating the synchronously pivoting assembly in a pivoting state.
Figure 13:
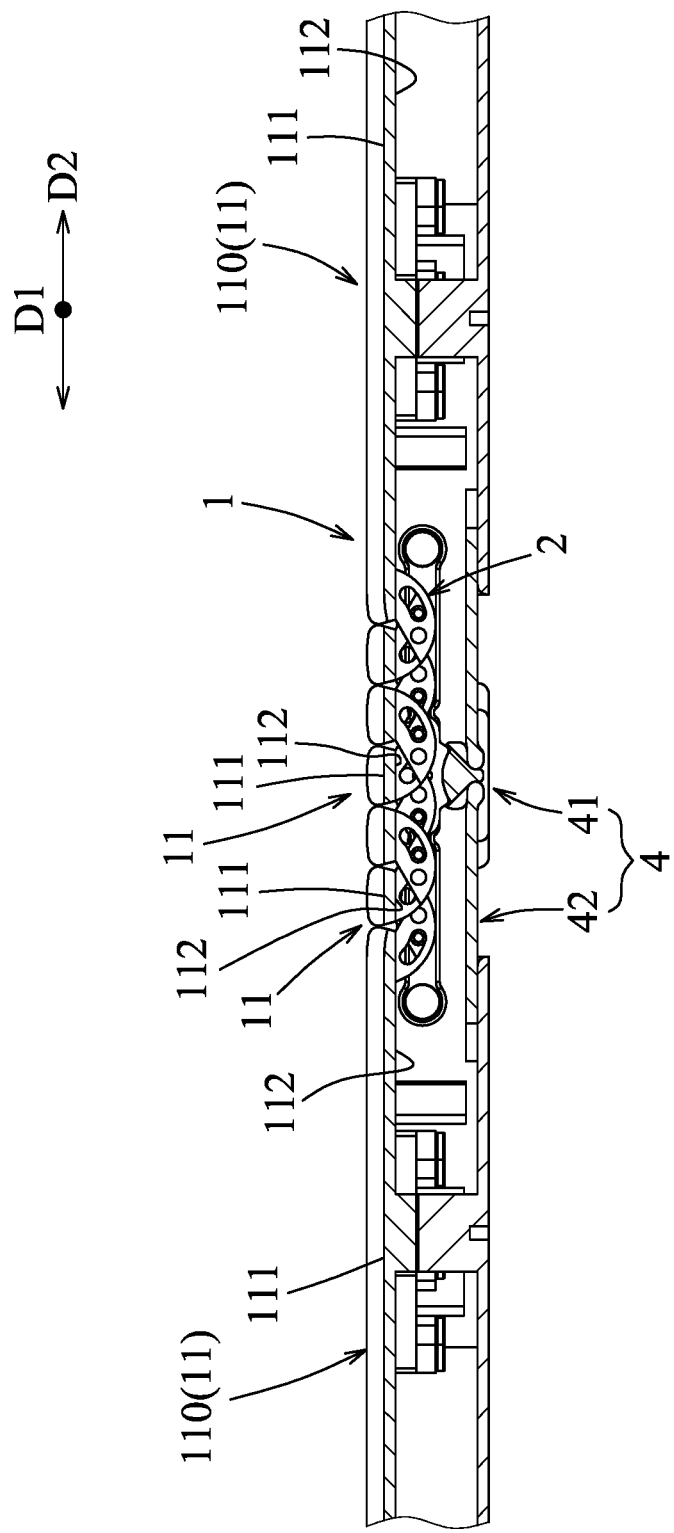
FIG. 13 is a fragmentary sectional view illustrating the embodiment in an unfolded state.
Figure 14:
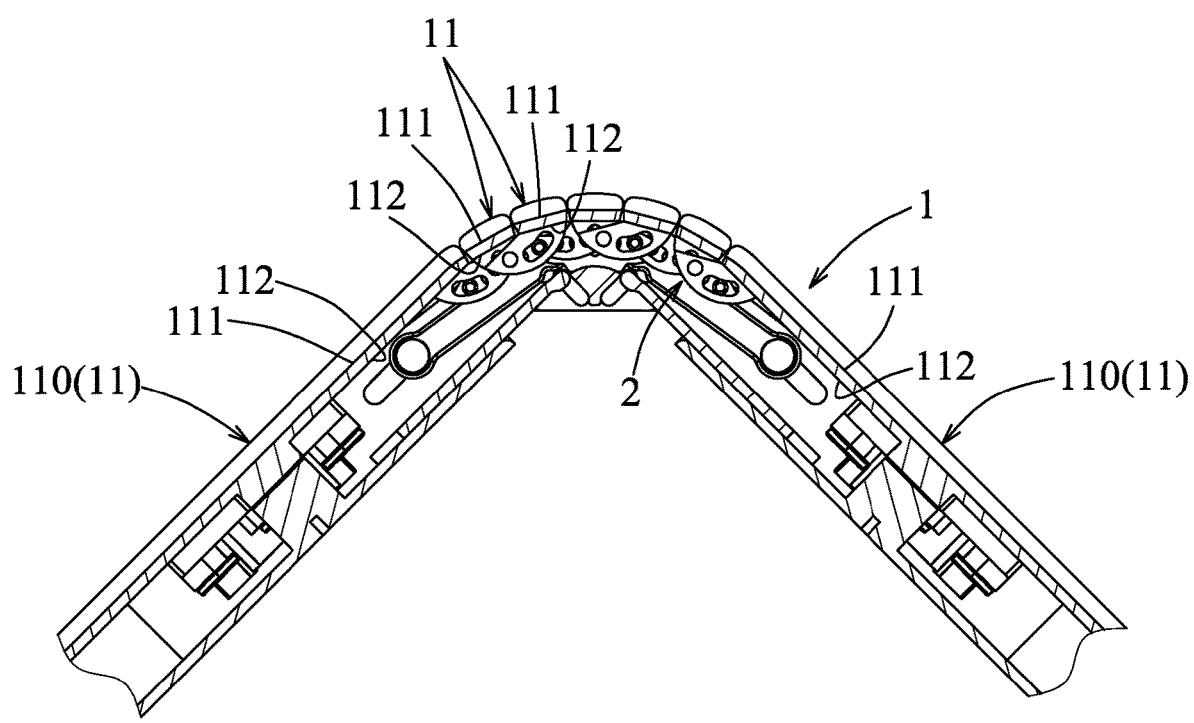
FIG. 14 is a fragmentary sectional view illustrating the embodiment during folding.
Figure 15:
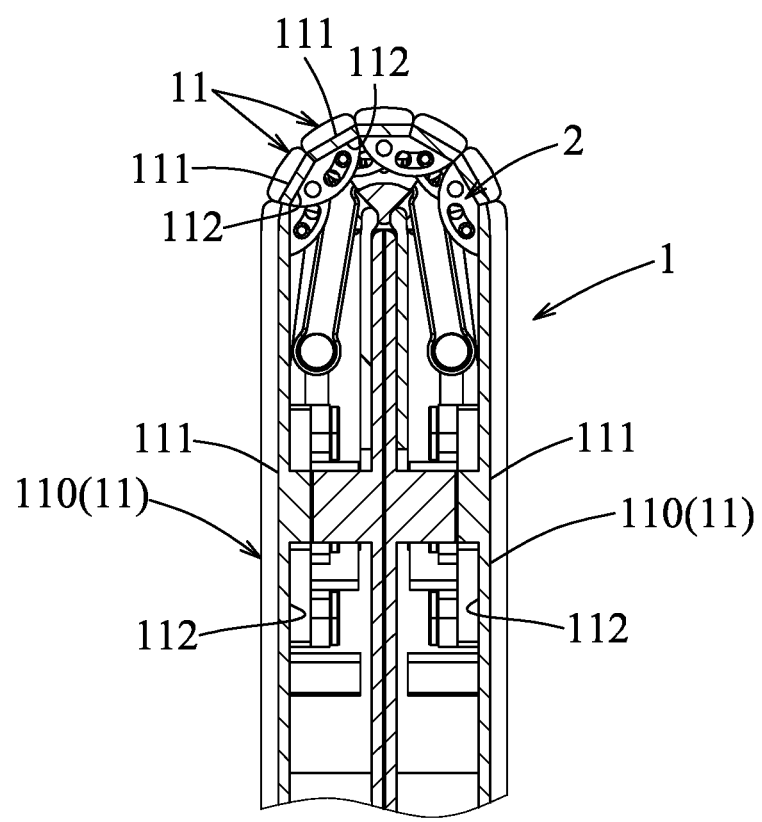
FIG. 15 is a fragmentary sectional view illustrating the embodiment in a folded state.
Figure 16:
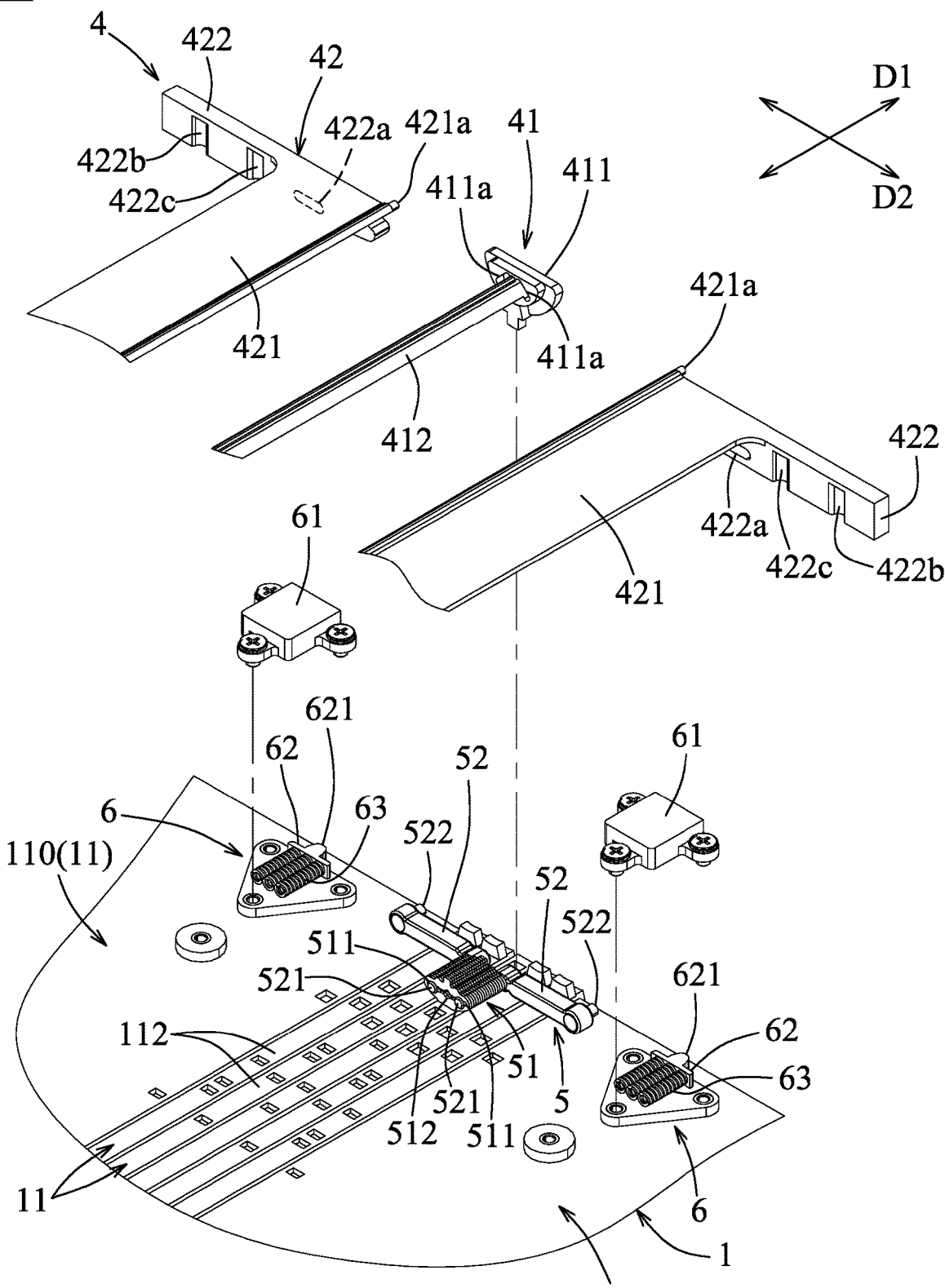
FIG. 16 is a fragmentary, partially exploded perspective view illustrating a support unit, a cover unit, friction increasing units and retaining mechanisms of the embodiment.
Figure 17:
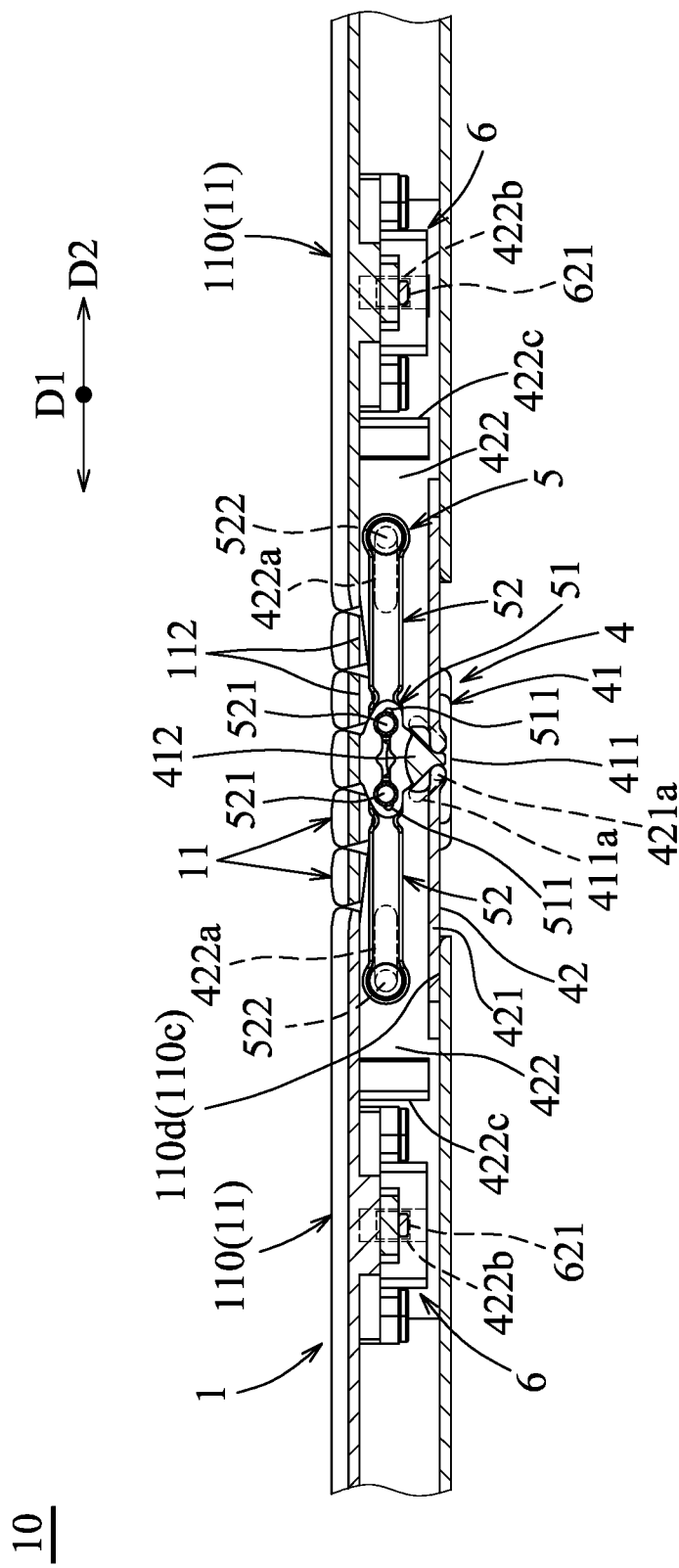
FIGS. 17 to 19 are fragmentary sectional views of FIG. 16, illustrating a state when the embodiment is being pivoted between the unfolded state and the folded state.
Figure 18:
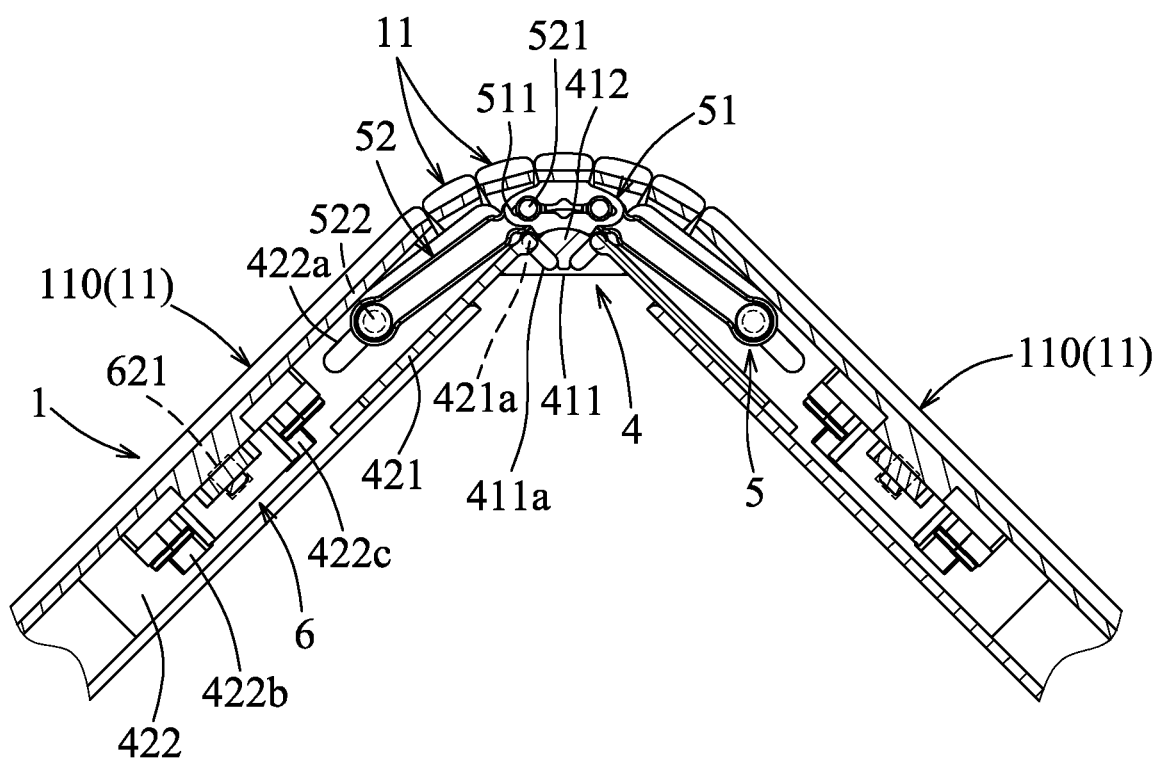
Figure 19:
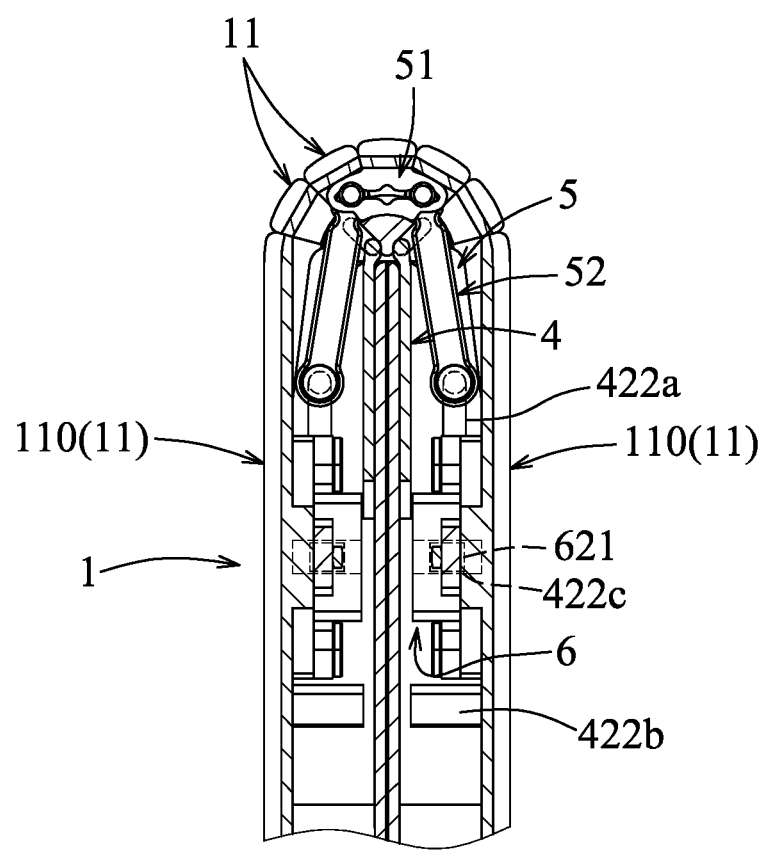

Referring to FIGS. 4 and 13 to 15, with the coaxially pivoting units 2 and the synchronously pivoting units 3, the bendable support apparatus 10 is shiftable between an unfolded state (see FIG. 13), where the support major surfaces 111 of the support members 11 are parallel to one another and arranged in the second direction (D2) to have the support surface in the form of a flat plane that extends in both the first and second directions (D1, D2), and a folded state (see FIG. 15), where the support major surfaces 111 of the support members 11 are inclined relative to adjacent ones of the support members 11 to have the support surface in the form of a curved plane. In this embodiment, in the folded state, the support housings 110 are superimposed upon and abut against each other. With reference to FIGS. 8 and 12, two adjacent support members 11 are pivoted relative to each other about the first pivot axis (A1) which is approximately located at the neutral layer (20a) of the flexible display 20, i.e., the layer where bending stresses are zero. Hence, damage to the flexible display 20 during the shifting operation of the bendable support apparatus 10 can be avoided. Moreover, with the synchronously pivoting mechanisms 313, the two lateral support members 11 are synchronously pivotable relative to the middle support member 11 in opposite rotational directions. In this embodiment, the support major surface 111 of each support member 11 is a flat surface such that, in the folded state, the curved plane of the support surface is cooperatively defined by the flat surfaces of the support major surfaces 111. In an alternative embodiment, the support major surface 111 of each support member 11 may be an arcuate surface.

Referring to FIGS. 3 and 16 to 19, the cover unit 4 includes a base frame 41 which is disposed to cover the mounting major surface 112 of an intermediate one of the support members 11, and two lateral cover plates 42 which are respectively disposed at two lateral ends of the base frame 41 in the second direction (D2) to cover the mounting major surfaces 112 of lateral ones of the support members 11 between the intermediate support member 11 and the support housings 110. The base frame 41 has a crosspiece 412 which extends in the first direction (D1) and is spaced apart from the intermediate support member 11, and two semicircular side plates 411 which are respectively connected to two ends of the crosspiece 412 and disposed on two opposite end portions of the mounting major surface 112 of the intermediate support member 11. Each of the side plates 411 has an arcuate rim which faces the mounting major surfaces 112 of the support members 11 such that the mounting major surfaces 112 abut against the arcuate rims of the side plates 411 in the folded state. Each of the support housings 110 has an opening (110d) which faces the base frame 41 for access to the accommodation space (110c). Each of the lateral cover plates 42 is pivotably and slidably connected with the side plates 411 to be slidable relative to and inserted into the accommodation space (110c) through the opening (110d) in the second direction (D2). Each of the lateral cover plates 42 has a main plate portion 421 which is configured to cover the mounting major surfaces 112 of the respective lateral support members 11, and two arm portions 422 which respectively extend from two opposite end portions of the main plate portion 421 in the first direction (D1) and toward the mounting major surfaces 112. With the base frame 41 and the lateral cover plates 42 covering and concealing the coaxially pivoting units 2, the synchronously pivoting units 3, the electronic elements, and associated wires and component parts (see FIG. 4), the aesthetic appeal of the bendable support apparatus 10 can be enhanced. Specifically, each of the side plates 411 of the base frame 41 has two inclined grooves (411a) extending to be inclined relative to the second direction (D2). Each of the lateral cover plates 42 has two pivot pins (421a) which respectively extend in the first direction (D1) from the two opposite end portions of the main plate portion 421 and each of which is slidably journalled in a respective one of the inclined grooves (411a). During the shifting of the bendable support apparatus 10 between the unfolded and folded states, the lateral cover plates 42 slide in the second direction (D2) relative to the support housings 110 while end edges of the main plate portions 421 thereof are kept in slidable attachment to the crosspiece 412 to be efficiently conceal the coaxially pivoting units 2, the synchronously pivoting units 3 and the associated electronic elements. In the exemplary, non-limited embodiment, each of the inclined grooves (411a) is inclined relative to the second direction (D2) by an included angle of 45 degrees.

Referring to FIGS. 4 and 16 to 19, the friction increasing units 5 are disposed on the intermediate support member 11 and respectively adjacent to the side plates 411. Each friction increasing unit 5 includes a third base seat 51 which is disposed on the mounting major surface 112 of the intermediate support member 11, and two frictional arms 52. The third base seat 51 is made of multiple stamping metal sheets. Each of the frictional arms 52 has an arm end pivotably connected to and in frictional engagement with the third base seat 51, and an opposite arm end slidably and pivotably connected to a respective one of the arm portions 422 in the second direction (D2). Specifically, the third base seat 51 has two pivot holes 511 respectively aligned with the arm ends of the frictional arms 52. Each arm portion 422 of each lateral cover plate 42 has an elongated groove (422a) extending in the second direction (D2). Each frictional arm 52 has at one arm end thereof a first pin 521 which is journalled in the respective pivot hole 511, and at the opposite arm end a second pin 522 which extends opposite to the first pin 521 in the first direction (D1) and which is slidably and rotatably engaged in the respective elongated groove (422a). During the shifting of the bendable support apparatus 10 between the unfolded and folded state, the lateral cover plates 42 are driven through the pivoting of the support housings 110 to be pivoted relative to the side plates 411 of the base frame 41 and to drive a pivoting of the frictional arms 52 relative to the third base seat 51. With the frictional engagement of the first pins 521 with the pivot holes 511, the support housings 110 can be angularly positioned relative to the intermediate support member 11. The number of the friction increasing units 5 can be varied as required. A split 512 may be formed to interconnect the pivot holes 511 to facilitate mounting of the first pins 521 in the pivot holes 511.

Referring again to FIGS. 16 to 19, the retaining mechanisms 6 of each pair are respectively disposed on the support housings 110 and adjacent to the arm portions 422 of the lateral cover plates 42. Each retaining mechanism 6 includes a mounting seat 61 which is disposed on the mounting major surface 112 of the corresponding support housing 110, a retaining member 62 which is slidably disposed on the mounting seat 61 in the first direction (D1), and a biasing member 63 which is connected between the mounting seat 61 and the retaining member 62. The retaining member 62 and the biasing member 63 are mounted in the mounting seat 61. The retaining member 62 has a projecting portion 621 which projects from the mounting seat 61 toward the corresponding arm portion 422 in the first direction (D1). Each arm portion 422 has first and second retaining grooves (422b, 422c) which are spaced apart from each other in the second direction (D2) and which face the first direction (D1). The projecting portion 621 of the retaining member 62 is configured to be retainingly engaged in the first retaining groove (422b) in the unfolded state and the second retaining groove (422c) in the folded state. The biasing member 63 is disposed to bias the retaining member 62 toward the corresponding arm portion 422 so as to retain the projecting portion 621 in a corresponding one of the first and second retaining grooves (422b, 422c) in the unfolded or folded state. The number of the retaining mechanisms 6 may be varied as required, such as two retaining mechanisms 6 are provided.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A bendable support apparatus for supporting a flexible display, comprising:
    a support unit including a plurality of support members each of which extends in a first direction and which are juxtaposed to each other in a second direction that is transverse to the first direction, each of said support members having support and mounting major surfaces opposite to each other, said support major surfaces of said support members cooperatively defining a support surface for the flexible display to be attached thereto;
    at least one coaxially pivoting unit including a plurality of coaxially pivoting assemblies each disposed between two adjacent ones of said support members, each of said coaxially pivoting assemblies including first and second pivoting members which are respectively disposed on said mounting major surfaces of said two adjacent ones of said support members and adjacent to each other in the first direction, said first pivoting member having an arcuate first sliding rail which extends to define a curvature center that is remoter from said mounting major surface than said support major surface and that is approximately located at a neutral layer of the flexible display, said second pivoting member having a second sliding protrusion which extends in the first direction and which is in slidable engagement with said first sliding rail such that said two adjacent ones of said support members are coaxially pivotable to each other about a first pivot axis that extends in the first direction and that passes through the curvature center; and
    at least one synchronously pivoting unit including a plurality of synchronously pivoting assemblies each disposed among three adjacent ones of said support members, each of said synchronously pivoting assemblies including a first base seat which is disposed on said mounting major surface of a middle one of said three adjacent support members, two second base seats which are respectively disposed on said mounting major surfaces of two lateral ones of said three adjacent support members and which are spaced apart from said first base seat in the first direction, and two synchronously pivoting mechanisms, each of which is disposed between and interconnects said first base seat and a respective one of said second base seats, each of said synchronously pivoting mechanisms being pivotably connected to said first base seat about a second pivot axis parallel to the first pivot axis, and being pivotably connected to said respective second base seat about a third pivot axis parallel to the second pivot axis, said synchronously pivoting mechanisms being in rollably frictional engagement with each other such that said two lateral support members are synchronously pivotable relative to said middle support member in opposite rotational directions,
    wherein said bendable support apparatus is shiftable between an unfolded state, where said support major surfaces of said support members are parallel to one another to have said support surface in the form of a flat plane that extends in both the first and second directions, and a folded state, where said support major surfaces of said support members are inclined relative to adjacent ones of said support members to have said support surface in the form of a curved plane.

2. The bendable support apparatus as claimed in claim 1, wherein said second pivoting member of each of said coaxially pivoting assemblies has an arcuate second sliding rail which extends to define a curvature center that is aligned with the curvature center of said first sliding rail in the first direction, said first pivoting member of each of said coaxially pivoting assemblies having a first sliding protrusion which extends in the first direction and which is in slidable engagement with said second sliding rail such that said two adjacent ones of said support members are coaxially pivotable to each other about the first pivot axis that passes through the curvature center of said second sliding rail.

3. The bendable support apparatus as claimed in claim 2, wherein each of said first and second sliding rails is in the form of an arcuate groove, and each of said first and second sliding protrusions is cylindrical to be slidably engaged in a respective one of said second and first sliding rails.

4. The bendable support apparatus as claimed in claim 1, wherein each of said synchronously pivoting mechanisms has a synchronously pivoting member which is pivotably connected to said first base seat about the second pivot axis, and a sliding member which is pivotably connected to said respective second base seat about the third pivot axis and which is slidably connected to said synchronously pivoting member, said synchronously pivoting members of said two synchronously pivoting mechanisms being in rollably frictional engagement with each other.

5. The bendable support apparatus as claimed in claim 4, wherein said synchronously pivoting members of said two synchronously pivoting mechanisms respectively have toothed surfaces meshing with each other.

6. The bendable support apparatus as claimed in claim 1, wherein two lateral ones of said support members in the second direction are respectively in the form of support housings, each of said support housings having an accommodation space formed therein, said mounting major surface of each of said support housings facing said accommodation space.

7. The bendable support apparatus as claimed in claim 6, further comprising a cover unit, said cover unit including a base frame which is disposed to cover said mounting major surface of an intermediate one of said support members, and two lateral cover plates which are respectively disposed at two lateral ends of said base frame in the second direction to cover said mounting major surfaces of lateral ones of said support members between said intermediate support member and said support housings, said base frame having a crosspiece which extends in the first direction and is spaced apart from said intermediate support member, and two side plates which are respectively connected to two ends of said crosspiece and disposed on two opposite end portions of said mounting major surface of said intermediate support member, each of said support housings having an opening which faces said base frame for access to said accommodation space, each of said lateral cover plates being pivotably and slidably connected with said side plates to be slidable relative to and inserted into said accommodation space through said opening in the second direction.

8. The bendable support apparatus as claimed in claim 7, wherein each of said lateral cover plates has a main plate portion which is configured to cover said mounting major surfaces of said respective lateral support members, and two arm portions which respectively extend from two opposite end portions of said main plate portion in the first direction and toward said mounting major surfaces.

9. The bendable support apparatus as claimed in claim 8, wherein each of said side plates of said base frame has two inclined grooves extending to be inclined relative to the second direction, each of said lateral cover plates having two pivot pins which respectively extend in the first direction from said two opposite end portions of said main plate portion and each of which is slidably journalled in a respective one of said inclined grooves.

10. The bendable support apparatus as claimed in claim 8, further comprising at least one friction increasing unit, said friction increasing unit including a third base seat which is disposed on said mounting major surface of said intermediate support member, and two frictional arms, each of which has an arm end pivotably connected to and in frictional engagement with said third base seat, and an opposite arm end slidably and pivotably connected to a respective one of said arm portions in the second direction so as to angularly position said respective support housing relative to said intermediate support member.

11. The bendable support apparatus as claimed in claim 10, wherein each of said arm portions of each of said lateral cover plates has at least one first retaining groove and at least one second retaining groove which are spaced apart from each other in the second direction and which face the first direction, said bendable support apparatus further comprising at least two retaining mechanisms which are respectively disposed on said support housings and adjacent to said lateral cover plates, each of said retaining mechanisms including a mounting seat which is disposed on said respective support housing, a retaining member which is movably disposed on said mounting seat in the first direction and which is configured to be retainingly engaged in said first retaining groove in the unfolded state and said second retaining groove in the folded state, and a biasing member which is disposed to bias said retaining member toward said corresponding one of said arm portions.

\* \* \* \* \*